United States Patent [19]

Sturt

[11] 3,862,913

[45] Jan. 28, 1975

[54] POLYMERIZATION PROCESS

[75] Inventor: Alan Charles Sturt, Guildford, England

[73] Assignee: BP Chemicals Limited, London, England

[22] Filed: Aug. 20, 1973

[21] Appl. No.: 389,665

Related U.S. Application Data

[63] Continuation of Ser. No. 179,212, Sept. 9, 1971, abandoned.

[30] Foreign Application Priority Data

Sept. 30, 1970 Great Britain............... 46602/70

[52] U.S. Cl........ 260/17 R, 260/880, 260/85.5 HC, 260/85.5 S, 260/86.7, 260/93.5 W, 260/93.5 A, 260/29.7 R

[51] Int. Cl............................................... C08f 1/13

[58] Field of Search.......... 260/17 A, 17 R, 29.7 R, 260/85.5 HC, 85.5 S, 85.5 N, 86.7, 93.5 W, 93.5 A, 880

[56] References Cited

UNITED STATES PATENTS

| | | | |
|---|---|---|---|
| 3,160,620 | 12/1964 | Petersen | 260/92.3 |
| 3,309,422 | 3/1967 | Doak et al. | 260/880 |
| 3,379,667 | 4/1968 | Pampus et al. | 260/29.7 R |

FOREIGN PATENTS OR APPLICATIONS

| | | | |
|---|---|---|---|
| 1,027,724 | 4/1966 | Great Britain | 260/17 A |

Primary Examiner—Lucille M. Phynes
Attorney, Agent, or Firm—Brooks Haidt & Haffner

[57] ABSTRACT

Rubber reinforced polymers prepared by destabilizing an aqueous rubber latex in presence of a cellulose based protective colloid and monomer, and polymerizing the monomer under suspension conditions.

4 Claims, No Drawings

POLYMERIZATION PROCESS

This is a continuation, of application Ser. No. 179,212, filed Sept. 9, 1971 now abandoned.

The present invention relates to a process for the production of rubber reinforced polymers derived from ethylenically unsaturated monomeric material.

British Patent Specification No. 1,027,724 describes a process for producing graft polymers in granular form of rubber and ethylenic monomer which comprises adding to a suspending system a rubber latex and catalyzed ethylenic monomer, partially coagulating the disperse phase to obtain suspension size particles, and thereafter polymerizing. Suspending agents are employed to stabilize the suspension size particles during the polymerization and in the examples polyvinyl alcohol and a calcium phosphate are used for this purpose.

It has now been found that the presence of a water soluble cellulose derivative in the system during the partial coagulation leads to an improved product whereas the presence of other organic colloids such as polyvinyl alcohol during the partial coagulation leads to the formation of unwanted crusty polymer in the reaction vessel which is often difficult to remove and so causes delay in the cleaning of the vessel between polymerisation runs.

An object of the present invention is to provide an improved process for the production of rubber reinforced polymers. A further object is to provide improved rubber reinforced polymers.

According to the present invention the process for the production of a rubber reinforced polymer comprises mixing the rubber in the form of an aqueous latex with monomeric material in the presence of an organic protective colloid which is a water soluble cellulose derivative, destroying the stability of the rubber latex, allowing the rubber particles protected by means of the colloid to pass into the monomeric material and polymerizing the monomeric material as a stable suspension in water.

The rubbers used in the process of the present invention may be the same as those described in British Patent Specification No. 1,027,724, namely any unsaturated rubber available in latex form. Examples are natural rubber, butadiene-styrene rubber, acrylonitrile-butadiene rubber, polyisoprene, polychloroprene, polybutadiene, ethylene-propylene rubbers containing residual unsaturation by virtue of a third monomer.

Any monomeric material in which at least some of the rubber chosen remains as a separate organic phase during the polymerization can be used in the process of the present invention. Examples are styrene, vinyl toluene, vinylidene chloride, ethyl acrylate, methyl methacrylate, acrylonitrile and alpha-methyl styrene and mixtures thereof. The process is particularly suited to the production of toughened polystyrene and toughened styrene/methyl methorylate copolymers and acrylonitrile/(polybutadiene)/styrene (ABS) terpolymers.

Only water soluble cellulose derivatives can be employed as protective colloids. Examples are methyl cellulose, carboxymethyl cellulose and hydroxyethyl cellulose. The preferred material is hydroxyethyl cellulose.

The relative quantities of reinforcing rubber and monomeric material can be varied widely in the process of the present invention depending on the weight proportion of rubber desired in the final product. This can vary from 1 to 95% and is chosen appropriately to the rubber/monomeric material employed. Generally the weight proportion of rubber is less than 50% and often less than 25% of the final product.

Various techniques may be employed to destroy the stability of the latex provided that uncontrolled coagulation of the rubber particles is avoided. By careful choice of the protective colloid in relation to the rubber and the monomeric material it is usually possible to destroy the stability of the latex in such a way that the rubber particles pass into the monomeric material without substantial change in particle size. The method used to destroy the stability of the latex will depend to some extent on the nature of the emulsifying agent employed in its production.

In a preferred method of operation the rubber latex is stabilised by means of a carboxylic acid salt emulsifying agent which can readily be converted into an inactive form by acidification of the system. Such emulsifying agents may be represented by the formula R.COOX where R is a large organic radical attached to the carboxyl salt group COOX. When a relatively strong acid (HA), i.e. an acid that is stronger than the acid from which the emulsifying agent is obtained, is added to the emulsifying agent the following reaction occurs:

R.COOX + HA — R.COOH + XA

The free acid R.COOH is not an emulsifying agent and thus acidification destroys the carboxylic acid salt type emulsifying agents. In this system the pH of the system can be reduced gradually and this gives a controlled hydrolysis of the emulsifier. This ability for gradual diminution of the emulsifying power of the agent is of value in ensuring that the size of the rubber particles is not substantially altered during their passage into the monomeric phase according to the process of the present invention. It is also possible to destroy such emulsifying agent by diluting the latex with water which causes hydrolysis of the salt and the conversion of the emulsifying agent to the non-effective free acid form. The preferred emulsifying agents are water soluble salts of saturated fatty acids containing from 8 to 20 carbon atoms, e.g. the alkali metal and ammonium salts of lauric, stearic, palmitic and myristic acids and mixtures thereof. These preferred emulsifying agents can be destroyed by adding acid to the system. Alternatively they can be destroyed by the addition of heavy metal (e.g. calcium, barium, cadmium and tin) salts, to the system. These may have, depending on the polymer system concerned, the advantage of converting the acid salt emulsifying agents to useful lubricants and stabilisers. Examples of other suitable carboxylic acid salt emulsifying agents are the rosin acid salts, e.g. alkali metal or ammonium salts of disproportionated rosin acids and oleic acid. Other techniques for destroying the stability of the latex include the addition of multi-valent ions such as aluminium salts to the aqueous phase of the latex. If care is taken during the addition of such salts it is again possible to cause the latex particles, protected by the cellulose based protective colloid; to pass into the monomeric material without substantial change in size and thus by controlling the particle size of rubber latex it is possible to control the size of the rubber particles in the final product.

The monomeric material containing the rubber particles derived from the latex is readily polymerised as a stable suspension using the known techniques of suspension polymerization, i.e. the polymerization of monomeric material in the form of droplets or particles which only coalesce or settle out from the aqueous phase when the mechanical stirring to which they are continuously subjected is stopped. In order to maintain the stability of the suspension throughout the polymerisation process it is generally necessary to add a suspension stabilizer to the polymerization system. Such stabilizers are well known and are chosen having regard to the monomeric material employed and can be of the organic or inorganic type. Examples of typical organic suspending agents are polyvinyl alcohol, partially hydrolysed polyvinylacetates, salts of styrenemaleic anhydride copolymers, gelatin, cellulose ethers such as methyl cellulose, hydroxypropyl methyl cellulose and hydroxyethyl cellulose. Examples of typical inorganic suspending agents are sparingly soluble metal phosphates such as hydroxy apatite. Mixtures of organic and inorganic suspending agents and of water soluble and insoluble suspending agents can be used.

The cellulose based protective colloids used in the first stage of the process can frequently act as suspension stabilisers. However it is found that it is generally necessary to add protective colloid as a separate step to ensure suspension stability during the polymerization stage because the colloid present during coagulation is not subsequently available to act as a suspension stabilizers.

The efficiency of the suspension stabilizer can be increased by the well known technique of including buffers and/or wetting agents in the system. It is important that the amount of wetting agent should not be so great as to cause emulsification of the monomeric materials. Examples of suitable wetting agents include anionic surface active agents such as sodium caproate and sodium oleate, organic sulphates and sulphonates such as long chain alkyl sulphates and sulphonates, alkyl aromatic sulphonates, arylalkyl polyether sulphonates and sodium salts of alkyl phosphates.

Conventional components of suspension polymerization systems can be present in the suspension polymerization step of the present invention e.g. polymerization initiator systems, molecular weight modifiers and the like. These are chosen according to the requirements of the monomeric material being polymerized. Similarly conventional phase ratios of organic to aqueous phases can be employed.

The following examples illustrate the process of the present invention:

EXAMPLE 1

A toughened polystyrene was prepared in a 1 gallon stainless steel reactor from the following ingredients which were added in the indicated order.

| | | |
|---|---|---|
| 1. Polybutadiene latex — total solids 60% using a mixture of resin and fatty acid salt emulsifying agents. | | 262.5 g. |
| 2. Distilled water | | 422 g. |
| 3. Natrosol 250HR (protective colloid) | (0.5% sol$^n$) | 505 ml. |
| 4. { Styrene | | 1050 g. |
|    Benzoyl peroxide | (70%) | 9.0 g. |
| 5. Phosphoric acid | (4.86% w/v) | 19.4 ml. |
| 6. { Natrosol 250HR (suspending agent | (0.5% sol$^n$) | 105 ml. |
|    Distilled water | | 945 ml. |
| Temperature | | 85°C for 8 hr. |
| Stirring characteristics — centre stirred anchor | | 300 r.p.m. |
| Natrosol 250HR is a hydroxy ethyl cellulose | | |

Procedure

Latex, water and protective colloid were added to reactor and stirred at 300 r.p.m. for 5 minutes. The monomer/initiator solution was added slowly over 5 minutes and the mixture in the reactor allowed to stir for 10 minutes. Phosphoric acid was added over 5 minutes to destroy the latex and system stirred for 15 minutes. Suspending agent solution was added over 5 minutes and reactor closed and purged 3 times with nitrogen. The contents were then heated to 85° C and held at that temperature for 8 hours.

The product was obtained in 93.8% yield as fine fibrous material. Sieve analysis gave the following results:

| Mesh size | Mesh No. | % Retained |
|---|---|---|
| 4.0 mm | 4 | 13.7 |
| 1.676 mm | 10 | 6.8 |
| 1.204 mm | 14 | 6.9 |
| 0.500 mm | 30 | 43.9 |
| 0.355 mm | 44 | 20.1 |
| 0.251 mm | 60 | 5.6 |
| 0.104 mm | 150 | 2.4 |
| 0.076 mm | 200 | 0.3 |
| | >200 | 0.2 |

By way of contrast the process was repeated but using a polyvinyl alcohol as both the protective colloid and suspending agent. Details were as follows:

Order of addition:

| | | |
|---|---|---|
| 1. Polybutadiene latex — total solids 60% made with a mixture of resin and fatty acid salt emulsifying agents. | | 262.5 g. |
| 2. Distilled water | | 860 g. |
| 3. Alcotex 88/10 (protective colloid) | (4% sol$^n$) | 63.0 ml. |

—Continued

| | | |
|---|---|---|
| 4. Styrene | | 1050 g. |
| Benzoyl peroxide | (70%) | 9.0 g. |
| 5. Phosphoric acid | (4.8% wt/vol) | 19.4 ml. |
| 6. Alcotex 88/10 (suspending agent) | (4% solution) | 26.2 ml. |
| Distilled water | | 1024 g. |
| Temperature | | 85°C for 8 hours. |
| Stirring characteristics—centre stirred anchor | | 300 r.p.m. |

Alcotex 88/10 is a polyvinyl alcohol.

Considerable hard crust formed on the stirrer blade, shaft, pot lid and at base of reactor. There was also a ring of crust at working level. Sieve analysis of the product (yield 73.%) gave the following results: The remainder of the product was in the form of a large lump of intractible material.

| Mesh No. | % Retained |
|---|---|
| 4 | 34.4 |
| 10 | 5.9 |
| 14 | 5.8 |
| 30 | 13.2 |
| 44 | 26.2 |
| 60 | 12.7 |
| 150 | 1.3 |
| 200 | 0.6 |
| >200 | none |

The loss of product as crust and as large beads were such that this procedure could not be operated commercially.

EXAMPLE 2

The procedure of example 1 was repeated with the following ingredients.
Order of addition:

| | | |
|---|---|---|
| 1. Polybutadiene latex — total solids 60% made with a mixture of resin and fatty acid salt emulsifying agents. | | 262.5 g. |
| 2. Distilled water | | 422 g. |
| 3. Natrosol 250HR (protective colloid) | (0.5% sol<sup>n</sup>) | 504 ml. |
| 4. Styrene | | 1050 g. |
| Benzoyl peroxide | (70%) | 9.0 g. |
| 5. Phosphoric acid | (4.86% w/v) | 19.4 ml. |
| 6. Alcotex 88/10 (suspending agent) | (4% sol<sup>n</sup>) | 26.2 ml |
| Distilled water | | 1050 g. |
| Temperature | | 85°C for 8 hr. |
| Stirring characteristics — centre stirred anchor | | 300 r.p.m. |

Sieve analysis of the product (yield 91%) gave the following results.

| Mesh No. | % Retained |
|---|---|
| 4 | 17.2 |
| 10 | 7.3 |
| 14 | 8.9 |
| 30 | 45.0 |
| 44 | 13.5 |
| 60 | 5.3 |
| 150 | 2.7 |
| 200 | 0.2 |
| >200 | 0 |

Some crusting occurred but it was easily broken and thus there was little loss of product. By way of contrast a process was carried out in a 2 litre glass reactor in which polyvinyl alcohol was added as the protective colloid and a hydroxy ethyl cellulose as the suspension stabilizer.
Order of addition:

| | | |
|---|---|---|
| 1. Polybutadiene latex (TS 60.5%) made with a mixture of rosin and fatty acid salt emulsifying agents) | | 109.5 g. |
| 2. Distilled water | | 439 g. |
| 3. Alcotex 88/10 (protective colloid) | (4% sol<sup>n</sup>) | 26.4 ml. |
| 4. Styrene | | 525 g. |
| Benzoyl peroxide | (70%) | 12.0 g. |
| 5. Phosphoric acid | (4.86% w/v) | 16.2 ml. |
| 6. Natrosol 250HR (suspending agent) | (0.5% sol<sup>n</sup>) | 52.5 ml. |
| Distilled water | | 472.5 g. |
| Temperature | | 90°C for 3 hr. |
| Stirring characteristics — marine paddle | | 500 r.p.m. |

Severe crusting of beads occurred on surface after 1¾ hr. polymerization.

EXAMPLE 3

The process of example 1 was repeated using the following ingredients.

| | | |
|---|---|---|
| 1. Polybutadiene latex made with a mixture of rosin and fatty acid emulsifiers | (TS 60.0) | 220.8 g. |
| 2. Distilled water | | 518 g. |
| 3. Natrosol 250 HR (protective colloid) | (0.5% sol$^n$) | 422 ml. |
| 4. { Styrene | | 1050 g. |
| { Benzoyl peroxide | (70%) | 9.0 g. |
| 5. Phosphoric acid | (4.86% w/v) | 21.6 ml. |
| 6. { Natrosol 250HR (suspending agent) | (0.5% sol$^n$) | 422 ml. |
| { Distilled water | | 945 g. |
| Temperature | | 80°C for 7 hr.<br>90°C for 3 hr. |
| Stirring characteristics — centre stirred anchor | | 30 r.p.m. |
| Beads were produced at a yield of 87.4% | | |

By way of contrast the procedure of Example 3 was repeated but all the Natrosol was added before the latex stability was destroyed. The product coalesced into one mass when the system was heated to 90° C.

EXAMPLE 4

Order of addition:

| | | |
|---|---|---|
| 1. Polybutadiene latex — total solids 60% made with a mixture of rosin and fatty acid salt emulsifying agents. | | 350 g. |
| 2. Distilled water | | 422 g. |
| 3. Natrosol 250HR (protective colloid) | (0.5% sol$^n$) | 672 ml. |
| 4. { Styrene | | 1050 g. |
| { Benzoyl peroxide | (70%) | 9.0 g. |
| 5. White Mineral oil | | 26.25 g. |
| 6. Phosphoric acid | (4.86% w/v) | 25.8 ml. |
| 7. { Alcotex 88/10 (suspending agent) | (4% sol$^n$) | 26.2 ml. |
| { Distilled water | | 1234. g. |
| Temperature | | 85°C for 8 hr. |
| Stirring characteristics — centre stirred anchor | | 300 r.p.m. |

The same procedure as in Example 1 was employed except that white mineral oil was added before the phosphoric acid.

The product was obtained in 97.0% yield as a fibrous material which had the following sieve analysis.

| Mesh No. | 4 | 10 | 14 | 30 | 44 | 60 | 150 | 200 | >200 |
|---|---|---|---|---|---|---|---|---|---|
| % Retained | 8.4 | 19.6 | 15.9 | 37.2 | 11.6 | 4.5 | 2.1 | 0.6 | 0 |

A very small quantity of crust formed on the blades and shaft of the stirrer and on the thermopocket.

EXAMPLE 5

The following example was carried out in a 2 litre glass reactor. The ingredients used and their order of addition is given below:

| | | |
|---|---|---|
| 1. Polychloroprene latex<br>emulsifying agents — disproportionated rosin acid salt, sodium salt of an alkyl aryl polyether sulphonate and the sodium salt of methylene dinaphtalene sulphonic acid. | (TS = 54.6%) | 91.6 g. |
| 2. Distilled water | | 193. g. |
| 3. Natrosol 250HR (protective colloid) | (0.5% sol$^n$) | 160 ml. |
| 4. { Styrene | | 350 g. |
| { Benzoyl peroxide | (70%) | 5.0 g. |
| 5. Acetic acid | (10% w/v) | 5.8 ml. |
| 6. { Alcotex 88/10 (suspending agent) | (4% sol$^n$) | 15. ml. |
| { Distilled water | | 375 g. |
| Temperature | | 90°C for 3 hr. |
| Stirrer characteristics — marine paddle | | 600 r.p.m. |

The latex, water and protective colloid were charged to the reactor and stirred for 5 minutes. Nitrogen was allowed to pass slowly through the reactor as a purging process. The monomer/initiator solution was added over 5 minutes and the system then stirred for 5 minutes. The acetic acid (to destroy the latex) and suspending agent solution were separately added during 5 minutes and stirring continued for 5 minutes before proceeding with the next stage. The contents were heated to 90° C for 3 hours. The product which was obtained in good yield had the following sieve analysis:

| Mesh No. | % Retained |
|---|---|
| 4 | 0.5 |
| 10 | 0.4 |
| 14 | 0.3 |
| 30 | 19.6 |
| 44 | 32.7 |
| 60 | 23.4 |
| 150 | 19.3 |
| 200 | 2.3 |
| >200 | 0.8 |

The material retained on the No. 4 mesh sieve was caked material which readily broke down to a fine powder.

EXAMPLE 7

The following example was carried out in a 2 litre glass reactor. The ingredients used and their order of addition is given below:

| | | | |
|---|---|---|---|
| 1. | Polybutadiene latex — total solids 60% made with a mixture of rosin and fatty acid salt emulsifying agents. | | 83.9 g. |
| 2. | Distilled water | | 203 g. |
| 3. | Natrosol 250HR (protective colloid) | (0.5% sol$^n$) | 160 ml. |
| 4. | { Methyl methacrylate | | 350 g. |
| | Benzoyl peroxide | (70%) | 5.0 g. |
| 5. | Acetic acid | (10% w/v) | 3.0 ml. |
| 6. | { Alcotex 88/10 (suspending agent) | (4% sol$^n$) | 15 ml. |
| | Distilled water | | 375 g. |
| | Temperature | | 85°C |
| | Stirring characteristics — marine paddle | | 600 r.p.m. |

EXAMPLE 6

The following example was carried out in a 2 litre glass reactor. The ingredients used and their order of addition is given below:

| | | | |
|---|---|---|---|
| 1. | Butadiene/acrylonitrile Rubber latex (TS 29.6% — emulsifying agents — salts of dodecyl benzene sulphonic acid and naphthalene formaldehyde sulphonate | | 169 g. |
| 2. | Distilled water | | 119 g. |
| 3. | Natrosol 250HR (protective colloid) | (0.5 sol$^n$) | 160 ml. |
| 4. | { Styrene | | 350 g. |
| | Benzoyl peroxide | (70%) | 5.0 g. |
| 5. | Acetic acid | (10% w/v) | 2.4 ml. |
| 6. | { Alcotex 88/10 (suspending agent) | (4% sol$^n$) | 15 ml. |
| | Distilled water | | 375 g. |
| | Temperature | | 90°C for 3 hr. |
| | Stirring characteristics — marine paddle | | 600 r.p.m. |

The procedure of Example 1 was employed and a product was obtained in a yield of 91.3%. Sieve analysis of the product gave the following sieve analysis:

| Mesh No. | % Retained |
|---|---|
| 4 | 24.9 |
| 10 | 10.3 |
| 14 | 7.9 |
| 30 | 21.5 |
| 44 | 10.7 |
| 60 | 7.6 |
| 150 | 12.6 |
| 200 | 1.4 |
| >200 | 0.1 |

The procedure of Example 1 was employed. The product had the following analyst:

| Mesh No. | % Retained |
|---|---|
| 4 | 41.6 |
| 10 | 21.5 |
| 14 | 15.8 |
| 30 | 20.5 |
| 44 | 0.7 |
| 60 | trace |
| 150 | 0 |
| 200 | 0 |
| >200 | 0 |

The material retained on the No. 4 mesh sieve was workable consisting of aggregates of beads, the aggregates being up to 5 mm in size.

EXAMPLE 8

The following example was carried out in a 2 litre glass reactor. The ingredients used and their order of addition is given below:

| | | | |
|---|---|---|---|
| 1. | Polybutadiene latex — total solids 60% made with a mixture of rosin and fatty acid salt emulsifying agents. | | 83.9 |
| 2. | Distilled water | | 203 g. |
| 3. | Natrosol 250HR (protective colloid) | (0.5% sol$^n$) | 160 ml. |
| 4. | Styrene | | 175 g. |
| | Methyl methacrylate | | 175 g. |
| | Benzoyl peroxide | (70%) | 5.0 g. |
| 5. | Acetic Acid | (10% w/v) | 3.0 ml. |
| 6. | Alcotex 88/10 (suspending agent) | (4% sol$^n$) | 15 ml. |
| | Distilled water | | 375 g. |
| | Temperature | | 85°C. |
| | Stirring characteristics — marine paddle | | 600 r.p.m. |

The procedure of Example 1 was employed. The product had the following sieve analysis:

| Mesh No. | % Retained |
|---|---|
| 4 | 5.8 |
| 10 | 6.6 |
| 14 | 14.7 |
| 30 | 57.8 |
| 44 | 11.0 |
| 60 | 2.9 |
| 150 | 0.6 |
| 200 | 0.6 |
| >200 | 0 |

EXAMPLE 9

The following example was carried out in a 2 litre glass vessel.
Order of addition:

| | | | |
|---|---|---|---|
| 1. | Polybutadiene latex — total solids 60% made with a mixture of rosin and fatty acid salt emulsifying agents. | | 83.9 g. |
| 2. | Distilled water | | 203 g. |
| 3. | Natrosol 250HR (protective colloid) | (0.5% sol$^n$) | 160 ml. |
| 4. | Styrene | | 227.5 g. |
| | Acrylontrile | | 122.5 g. |
| | Benzoyl peroxide | (70%) | 5.0 g. |
| 5. | Acetic acid | (10% w/v) | 3.0 ml. |
| 6. | Alcotex 83/10 (suspending agent) | (4% sol$^n$) | 17.5 ml. |
| | Distilled water | | 382.5 g. |
| | Temperature | | 80°C. |
| | Stirring characteristics — marine paddle | | 600 r.p.m. |

The procedure of Example 1 was employed. The product was obtained in 86.5% yield as aggregated beads with an aggregate size of about 5mm.

EXAMPLE 10

The following polymerization was performed in a 2 litre glass reactor according to the procedure of Example 1.

The ingredients were added in the following order:

| | | | |
|---|---|---|---|
| 1. | Polybutadiene latex — total solids 59.3% using a mixture of rosin and fatty acid salt emulsifying agents | | 84.3 g. |
| 2. | Distilled water | | 283 g. |
| 3. | Natrosol 250GR (protective colloid) | (1% sol*) | 80 ml. |
| 4. | Styrene | | 350 g. |
| | Benzoyl peroxide | | 3.5 g. |
| 5. | Acetic acid | (10% w/w sol*) | 2 ml. |
| 6. | Alcotex 83/10 (suspending agent) | (4% sol*) | 15 ml. |
| | Distilled water | | 375 g. |
| | Temperature | | 90°C for 3 hr. |
| | Stirring characteristics — marine paddle | | 600 r.p.m. |

Natrosol 250GR is a hydroxyethyl cellulose of lower molecular weight than Natrosol 250HR.

The product was obtained in high yield with very little reactor fouling.

I claim:

1. In a process for the polymerization of a rubber reinforced polymer by mixing the latex with monomeric material selected from the group consisting of styrene, a styrene-acrylonitrile mixture, and a styrene-methyl methacrylate mixture, causing the rubber particles protected by means of a colloid to pass into the monomeric material by destroying the stability of the rubber latex, and polymerizing the monomeric suspension in water, the improvement which comprises mixing the latex and the monomeric material in the presence of a protective colloid which is a water-soluble cellulose compound and stabilizing the suspension of monomeric material during the polymerization by the addition, subsequent to causing the rubber particles to pass into the monomeric material, of a suspension stabilizer.

2. As a process as claimed in claim 1 wherein the protective colloid is a hydroxyethyl cellulose.

3. The process as claimed in claim 1, wherein the rubber latex is stabilised by means of a carboxylic acid salt emulsifying agent which is subsequently destroyed by the addition of a relatively strong acid to the aqueous phase.

4. The process as claimed in claim 3, wherein the emulsifying agent is an alkali metal or ammonium salt of a saturated fatty acid containing from 8 to 20 carbon atoms.

* * * * *

UNITED STATES PATENT OFFICE
CERTIFICATE OF CORRECTION

PATENT NO. : 3,862,913
DATED : January 28, 1975
INVENTOR(S) : ALAN CHARLES STURT It is certified that error appears in the above-identified patent and that said Letters Patent are hereby corrected as shown below:

Col. 12, Example 9, at No. 6, "Alcotex 83/10" should read --Alcotex 88/10--.

Col. 12, Example 10, at No. 6, "Alcotex 83/10" should read --Alcotex 88/10--.

Signed and sealed this 15th day of July 1975.

(SEAL)
Attest:

RUTH C. MASON
Attesting Officer

C. MARSHALL DANN
Commissioner of Patents
and Trademarks